Aug. 17, 1926.
H. J. DOTTERER
1,596,411
SASH LOCK
Filed May 29, 1925
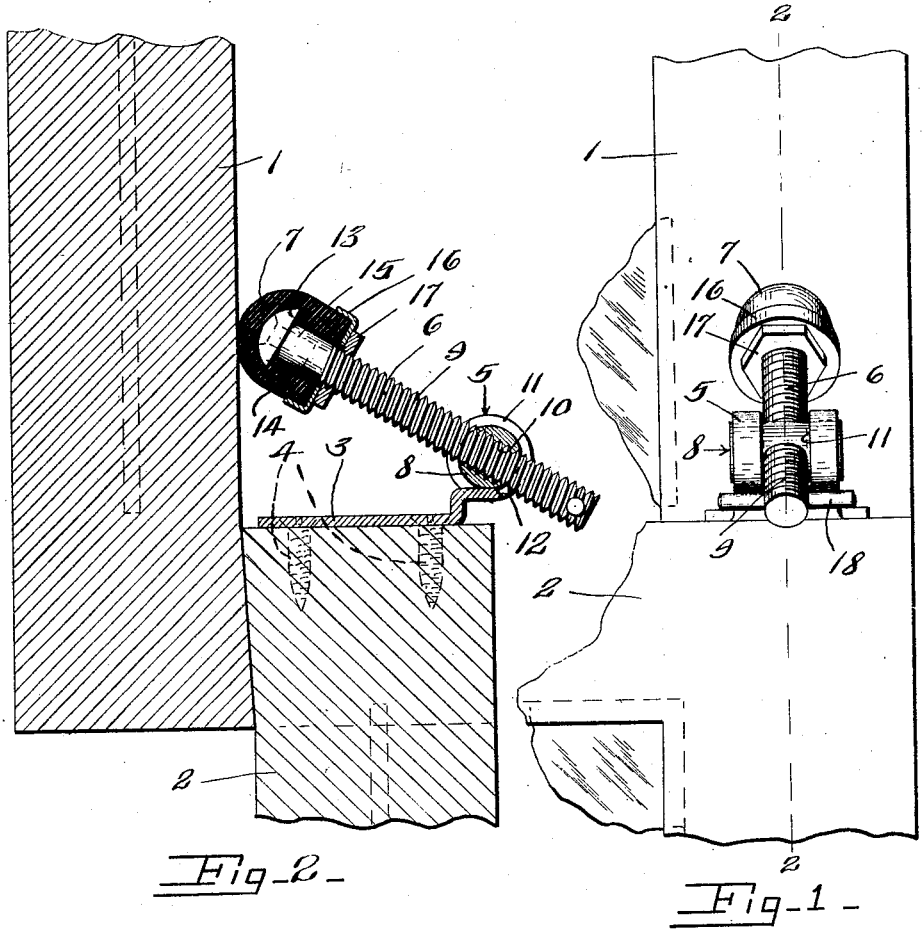
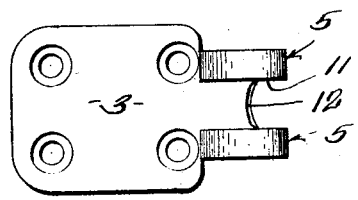
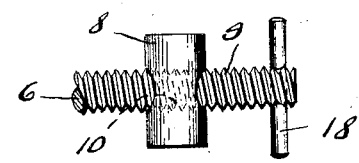
INVENTOR.
Henry J. Dotterer Patented Aug. 17, 1926.

1,596,411

UNITED STATES PATENT OFFICE.

HENRY J. DOTTERER, OF SYRACUSE, NEW YORK.

SASH LOCK.

Application filed May 29, 1925. Serial No. 33,600.

This invention has for its object a particularly simple and efficient lock for window sashes, that is, a lock for locking the upper and lower sashes together, when the sashes are entirely closed, and a lock that prevents the further opening of the sashes when either one or both are partly open, but allows the same to be closed.

This lock is particularly simple and economical in construction, is readily applied to any sash and will not mar or destroy the same.

This invention consists in the novel features and in the combinations and constructions hereinafter set forth and claimed.

In describing this invention reference is had to the accompanying drawings in which like characters designate corresponding parts in all the views.

Figure 1 is a fragmentary elevation of two window sashes provided with my lock.

Figure 2 is a sectional view taken on line 2—2, Fig. 1.

Figure 3 is a plan view of the base plate.

Figure 4 is a fragmentary elevation of the bolt and parts associated therewith.

In the drawing 1 and 2 designate upper and lower sashes of the window, and 3 is the base plate. Said base plate is fixed to the top of the sash 2 by means of screws 4, and is provided at its inner end with a cylindrical bearing 5 at its rear end.

6 is the bolt provided at one end with a rubber bumper 7, which is fixed thereto in such a manner that it will not come off when subjected to great pressure, and is movable axially with respect to the bolt as hereinafter described.

8 is a bearing member through which the bolt 6 is adjusted back and forth by means of the screw threads 9. The bearing member 8 is preferably cylindrical in general form and as here shown is provided with a threaded passage 10 extending diametrically therethrough.

The bearing 6 on the base plate 3 is formed with a slot 11, and when assembled the bolt is pivotally mounted in the bearing by means of the bearing member 8, with the bolt extending through the slot 11.

The bolt 6 is thus mounted on a horizontal pivot and said pivotal movement is limited to approximately sixty degrees. The downward movement being limited by the bumper 7 contacting with the base plate 3 when in a horizontal position, and the upward movement is limited by the bolt 6 contacting with the bottom 12 of the slot 11.

The bolt as here shown is formed with a head 13, providing a shoulder 14 over which the rubber bumper 7 is stretched, a comparatively large portion of the rubber bumper extends below said shoulder 14 and fits the shank portion 15 of the bolt. I have here shown a cap 16 extending over the lower end of the rubber bumper, and a nut 17 to hold the cap 16 in place. Thereby preventing that portion of the rubber bumper below the shoulder 14 from stretching over said shoulder and thereby displacing said bumper 7, as when the sash 1 is moved downwardly, causing a great pressure to be exerted upon said bumper.

As will be obvious to those skilled in the art, the cap 16 and nut 17 may be dispensed with by providing a greater length of rubber extending along the bolt 6 and back of the shoulder 14, or the bolt may be threaded its entire length with a rubber bumper threaded thereon, and of sufficient length to prevent its being forced off by the great pressure.

By the construction shown the bumper can be readily renewed when worn, and can be produced at a very small cost, and by my construction of window lock, the parts can all be assembled ready to put on when sold, and when in place upon the sash there are no parts that can be readily removed or lost.

In operation the bolt 6 is adjusted to about the angle shown in Fig. 2, with the rubber bumper 7 thereof resting lightly against or frictionally engaging the sash 1, movement of the sash 1 downwardly or of the sash 2 upwardly increases the frictional engagement or pressure of the bumper 7 against the sash 1 and effectively prevents any further opening of either one of said sashes, but allows them to be closed, and by screwing the rubber bumper 7 tightly against the sash 1 this window lock prevents the sashes from rattling.

18 is a hand grip which may be of any desirable construction.

What I claim is:—

1. A device for locking the upper and lower sashes of double windows comprising a bracket adapted to be mounted on the top of the lower sash, said bracket being provided with a horizontally disposed bearing, a cylindrical bearing member pivotally mounted to move freely in said bearing, having a threaded passage diametrically therethrough, a bolt adjustably mounted in said passage and arranged when in its operative position to extend upwardly at an angle toward the upper sash, and a removable member on one end of said bolt for frictionally engaging the upper sash.

2. A device for locking the upper and lower sashes of double windows, comprising a bracket adapted to be mounted on the top of the lower sash, said bracket being provided with a horizontally disposed bearing having a slot therein, a cylindrical bearing member pivotally mounted in said bearing having a threaded passage diametrically therethrough, a bolt adjustably mounted in said passage and extending through said slot for limiting the pivotal movement, and a removable member on one end of said bolt for frictionally engaging the upper sash.

3. A device for locking the upper and lower sashes of double windows, comprising a bracket adapted to be mounted on the top of the lower sash, said bracket being provided with a horizontally disposed bearing having a slot therein, a cylindrical bearing member pivotally mounted in said bearing having a threaded passage diametrically therethrough, a bolt adjustably mounted in said passage and extending through said slot for limiting the pivotal movement, and a member for frictionally engaging the upper sash extending over one end of said bolt with the greater portion thereof extending below said end and tightly gripping the sides of said bolt.

4. A device for locking the upper and lower sashes of double windows, comprising a bracket adapted to be mounted on the top of the lower sash, said bracket being provided with a horizontally disposed bearing having a slot therein, a cylindrical bearing member pivotally mounted in said bearing having a threaded passage diametrically therethrough, a bolt adjustably mounted in said passage and extending through said slot for limiting the pivotal movement, an enlarged head on one end of said bolt providing a shoulder, and a rubber member for frictionally engaging the upper sash extending over said head and shoulder with the greater portion thereof extending below said shoulder, and tightly gripping the bolt.

5. A device for locking the upper and lower sashes of double windows, comprising a bracket adapted to be mounted on the top of the lower sash, said bracket being provided with a horizontally disposed bearing having a slot therein, a cylindrical bearing member pivotally mounted in said bearing having a threaded passage diametrically therethrough, a bolt adjustably mounted in said passage and extending through said slot for limiting the pivotal movement, an enlarged head on one end of said bolt providing a shoulder, a rubber member for frictionally engaging the upper sash extending over said head and shoulder with the lower end portion thereof extending along said bolt below said shoulder, a cap on said bolt extending over the lower end of said rubber member and a nut threading on said bolt against said cap.

6. A device for locking the upper and lower sashes of double windows from movement toward an open position but allowing said sashes to be moved to a closed position comprising a bracket adapted to be mounted on the top of the lower sash, said bracket being provided with a horizontally disposed bearing, a cylindrical bearing member pivotally mounted in said bearing to move freely relatively thereto and having a threaded passage diametrically therethrough, a bolt threading in said passage arranged when in its operative position to extend upwardly at an angle toward the upper sash, and a member on the forward end of said bolt for frictionally engaging the upper sash.

In testimony whereof, I have hereunto signed my name, at Syracuse, in the county of Onondaga and State of New York, this 16th day of May, 1925.

HENRY J. DOTTERER.